(12) United States Patent
Hands et al.

(10) Patent No.: US 11,567,784 B2
(45) Date of Patent: Jan. 31, 2023

(54) SYSTEMS AND METHODS FOR REDUCING FORCED APPLICATION TERMINATION

(71) Applicant: Netflix, Inc., Los Gatos, CA (US)

(72) Inventors: Ben Hands, Mountain View, CA (US); Yongjian Kang, Sunnyvale, CA (US)

(73) Assignee: Netflix, Inc., Los Gatos, CA (US)

( * ) Notice: Subject to any disclaimer, the term of this patent is extended or adjusted under 35 U.S.C. 154(b) by 478 days.

(21) Appl. No.: 16/737,690

(22) Filed: Jan. 8, 2020

(65) Prior Publication Data
US 2021/0208906 A1    Jul. 8, 2021

(51) Int. Cl.
| | | |
|---|---|---|
| *G06F 9/46* | (2006.01) | |
| *G06F 9/445* | (2018.01) | |
| *G06N 20/00* | (2019.01) | |
| *G06F 9/48* | (2006.01) | |
| *G06F 9/50* | (2006.01) | |
| *G06N 5/04* | (2006.01) | |

(52) U.S. Cl.
CPC .......... *G06F 9/44594* (2013.01); *G06F 9/485* (2013.01); *G06F 9/5005* (2013.01); *G06N 5/04* (2013.01); *G06N 20/00* (2019.01)

(58) Field of Classification Search
CPC .... G06F 9/44594; G06F 9/485; G06F 9/5005; G06N 20/00; G06N 5/04
See application file for complete search history.

(56) References Cited

U.S. PATENT DOCUMENTS

| | | |
|---|---|---|
| 9,760,399 B1 | 9/2017 | Fraser et al. |
| 10,101,910 B1 | 10/2018 | Karppanen |
| 10,289,446 B1 | 5/2019 | Karppanen |
| 2013/0097605 A1 | 4/2013 | Martinka et al. |
| 2019/0228324 A1* | 7/2019 | Bardini ................. G06N 5/045 |

FOREIGN PATENT DOCUMENTS

EP    3 502 889 A1    6/2019

OTHER PUBLICATIONS

International Search Report and Written Opinion received for PCT Application Serial No. PCT/US2021/012718 dated Apr. 9, 2021, 12 pages.
Microsoft, "Reduce memory usage when your app moves to the background state", URL: https://docs.microsoft.com/en-us/windows/uwp/launch-resume/reduce-memory-usage, Aug. 2, 2017, 7 pages.

* cited by examiner

*Primary Examiner* — Gregory A Kessler
(74) *Attorney, Agent, or Firm* — Greenberg Traurig, LLP

(57) ABSTRACT

The disclosed computer-implemented method may include detecting an application running in a background state on a client device. The method may also include collecting state data about a current state of the client device. Additionally, the method may include determining, by applying a machine learning model to the collected state data, that a likelihood of forcible termination of the application within a predetermined timeframe exceeds a threshold. Furthermore, the method may include reducing a computing resource footprint of the application on the client device to reduce the likelihood of forcible termination of the application. Various other methods, systems, and computer-readable media are also disclosed.

20 Claims, 11 Drawing Sheets

SYSTEMS AND METHODS FOR REDUCING FORCED APPLICATION TERMINATION

BACKGROUND

Software applications can enhance the use of computing devices by providing additional functionality to users. Applications that run on a device often use the resources of the device, such as the device's processing power or digital memory. Some applications may use minimal resources even after a user has closed the application. For instance, an application may maintain a small processing footprint on the device in order to start faster when the user launches the application again. By running in a background state on the device, the application may be able to retain important data, such as user login information, so that the user does not have to log in when relaunching the application.

However, due to a limited amount of resources, computing devices may sometimes attempt to identify background applications that are using these resources and force the applications to stop running in the background. For example, when available memory is low, an operating system may terminate the background applications using the most memory. Traditionally, in order to avoid forced termination by the operating system, some applications may clear a memory cache or reduce other resource use during the initial transition to a background state. Unfortunately, for an application that is sensitive to startup time or that requires more resources in the background state, reducing resource use when a user closes the application may not be feasible or preferred. For instance, some applications may clear a memory cache or reduce other resource usage prematurely and, as a result, may require a longer time to return to previous states when reopening.

SUMMARY

As will be described in greater detail below, the present disclosure describes systems and methods for reducing or preventing forced termination of software applications. In one example, a computer-implemented method for preventing forced application termination may include detecting an application running in a background state on a client device. The method may also include collecting state data about a current state of the client device. Additionally, the method may include determining, by applying a machine learning model to the collected state data, that a likelihood of forcible termination of the application within a predetermined timeframe exceeds a threshold. Furthermore, the method may include reducing a computing resource footprint of the application on the client device to reduce the likelihood of forcible termination of the application.

In one embodiment, the background state may include a closed state of the application. Additionally, the background state may include a use of one or more computing resources of the client device by the application.

In one example, the state data may include a state of a memory, a battery, a processor, a network connection, an operating system, the application, and/or a second application. In this example, the machine learning model may include a model trained using historical state data of the client device, historical state data of a second client device, a historical record of forcible termination of the application, and/or a historical record of forcible termination of the second application. Additionally, in this example, forcible termination may include an automated termination of one or more background processes of the application by the operating system of the client device.

In some examples, reducing the computing resource footprint may include reducing usage of a memory cache and/or reducing a size of the application. Additionally or alternatively, reducing the computing resource footprint may include terminating a process of the application and/or terminating usage of a computing resource.

In one embodiment, reducing the computing resource footprint to reduce the likelihood of forcible termination of the application may include identifying a target state of the client device with a target likelihood of forcible termination of the application that does not exceed the threshold. In this embodiment, reducing the computing resource footprint may also include reducing the computing resource footprint to achieve the target state of the client device.

In some embodiments, the above method may further include detecting a change in the current state of the client device and adjusting the likelihood of forcible termination of the application based on the change. In these embodiments, the method may further include predicting a future state of the client device based on the change in the current state of the client device.

In some examples, the above method may further include detecting a forcible termination of the application within the predetermined timeframe and updating historical data with the collected state data and the forcible termination. In these examples, the method may further include retraining the machine learning model with the updated historical data.

In addition, a corresponding system for preventing forced application termination may include several modules stored in memory, including a detection module that detects an application running in a background state on a client device. The system may also include a collection module that collects state data about a current state of the client device. Additionally, the system may include a determination module that determines, by applying a machine learning model to the collected state data, that a likelihood of forcible termination of the application within a predetermined timeframe exceeds a threshold. Furthermore, the system may include a reduction module that reduces a computing resource footprint of the application on the client device to reduce the likelihood of forcible termination of the application. Finally, the system may include one or more processors that execute the detection module, the collection module, the determination module, and the reduction module.

In one example, the detection module may detect the background state of the application by detecting a closing of the application. In this example, the detection module may also monitor a continued background process of the application after the closing of the application.

In some embodiments, the collection module may include a client module on the client device that sends the collected state data to a server and/or a server module on the server that requests the collected state data from the client device. In these embodiments, the machine learning model may be trained by the client device using historical state data of the client device and/or the server using historical state data of multiple client devices. Additionally, in these embodiments, the server may send the machine learning model to the client device.

In one example, the machine learning model may be tailored to the application and/or the client device. Additionally or alternatively, the machine learning model may be tailored to a user of the client device.

In one embodiment, the determination module may determine that the likelihood of forcible termination of the application within the predetermined timeframe does not exceed the threshold. In this embodiment, the reduction module may suspend a reduction of the computing resource footprint based on determining the likelihood of forcible termination does not exceed the threshold.

In some examples, the above-described method may be encoded as computer-readable instructions on a computer-readable medium. For example, a computer-readable medium may include one or more computer-executable instructions that, when executed by at least one processor of a computing device, may cause the computing device to detect an application running in a background state on a client device. The instructions may also cause the computing device to collect state data about a current state of the client device. Additionally, the instructions may cause the computing device to determine, by applying a machine learning model to the collected state data, that a likelihood of forcible termination of the application within a predetermined timeframe exceeds a threshold. Finally, the instructions may cause the computing device to reduce a computing resource footprint of the application on the client device to reduce the likelihood of forcible termination of the application.

Features from any of the embodiments described herein may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the present disclosure.

Figure 1:
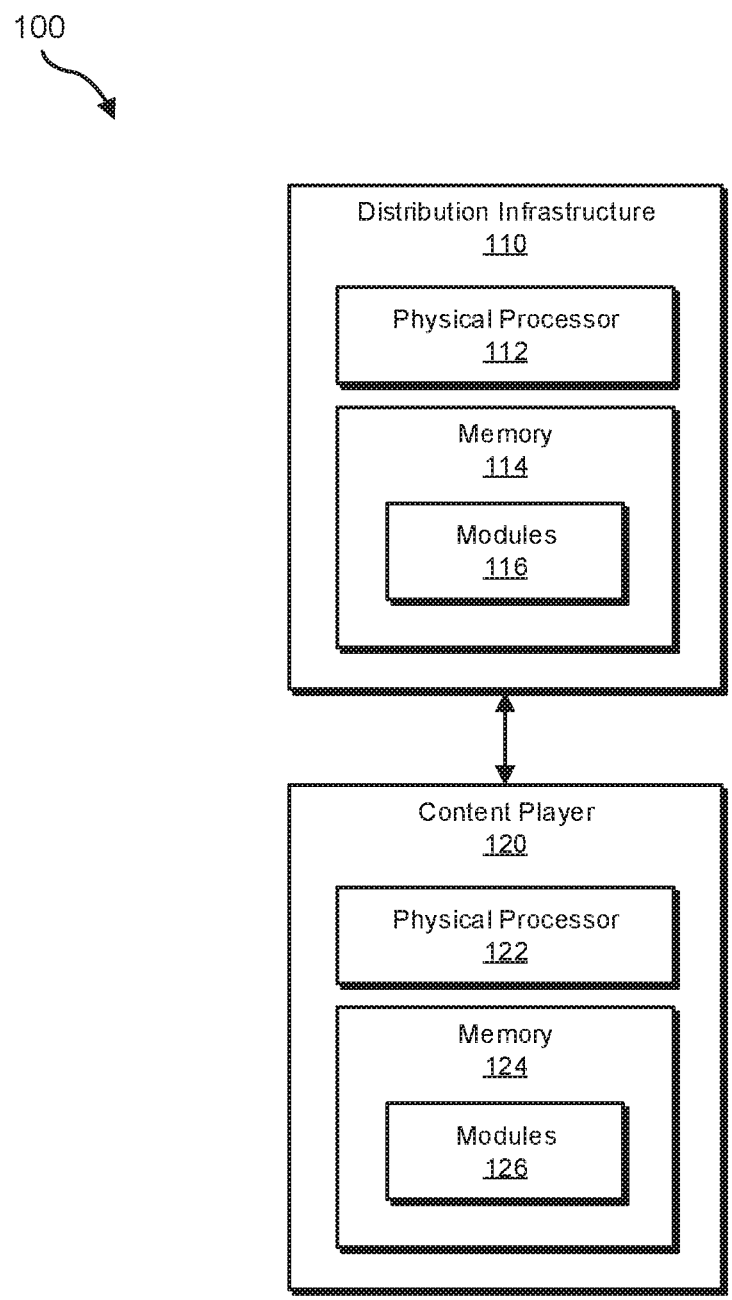
FIG. 1 is a block diagram of an exemplary content distribution ecosystem.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the present disclosure covers all modifications, equivalents, and alternatives falling within the scope of the appended claims.

DETAILED DESCRIPTION OF EXEMPLARY EMBODIMENTS

The present disclosure is generally directed to reducing or preventing the forcible termination of software applications. As will be explained in greater detail below, embodiments of the present disclosure may, by training a machine learning model to predict when an application may be forcibly closed, improve the management of background applications. The disclosed systems and methods may first detect applications running in a background state on a client device. For example, the disclosed systems and methods may determine that a user has closed an application but that the application continues to use some resources of the client device. By collecting state data about the client device, the systems and methods described herein may evaluate the available resources of the client device. The disclosed systems and methods may then apply a machine learning model to the state data to determine that a background application is in danger of immediate forcible termination. For example, the systems and methods described herein may use a model trained with historical data about application termination to predict the background application may be terminated by an operating system within a given timeframe. Furthermore, the disclosed systems and methods may reduce the use of a computing resource by the application to avoid termination.

Traditionally, applications may reduce the use of resources when moving from an active state to a background state. For example, an application may clear its memory cache or terminate unnecessary processes to run in a low-resource background state. In other examples, an application may routinely perform maintenance in the background state to ensure a smaller footprint is maintained. However, some applications may require more resources to run in the background and/or to ensure faster startup times when moving from the background state back to an active state. Furthermore, applications may prefer to maintain higher resource use if resources are not currently constrained, either due to usage by other active applications or fewer total resources. By monitoring the state of the client device and the resources of the client device, the disclosed systems and methods may enable applications to maintain higher resource usage in a background state and remain in the background state for a longer period of time. Additionally, by predicting when an application may be forcibly terminated, the disclosed systems and methods may preempt the forced termination of an application by reducing the usage of certain resources prior to termination, which may prevent the application from being selected for termination (or at least greatly reduce the likelihood thereof).

The systems and methods described herein may improve the functioning of a computing device by improving the timing of reduced usage of resources by background applications. In addition, these systems and methods may also improve the fields of resource management and application startup by only reducing resource use when necessary to avoid termination. Thus, the disclosed systems and methods may improve over traditional methods of reducing or preventing forced application termination of background applications.

Because many of the embodiments described herein may be used with substantially any type of computing network, including distributed networks designed to provide video content to a worldwide audience, various computer network and video distribution systems will initially be described with reference to FIGS. 1-3. These figures will introduce the various networks and distribution methods used to provision video content to users.

Figure 4:
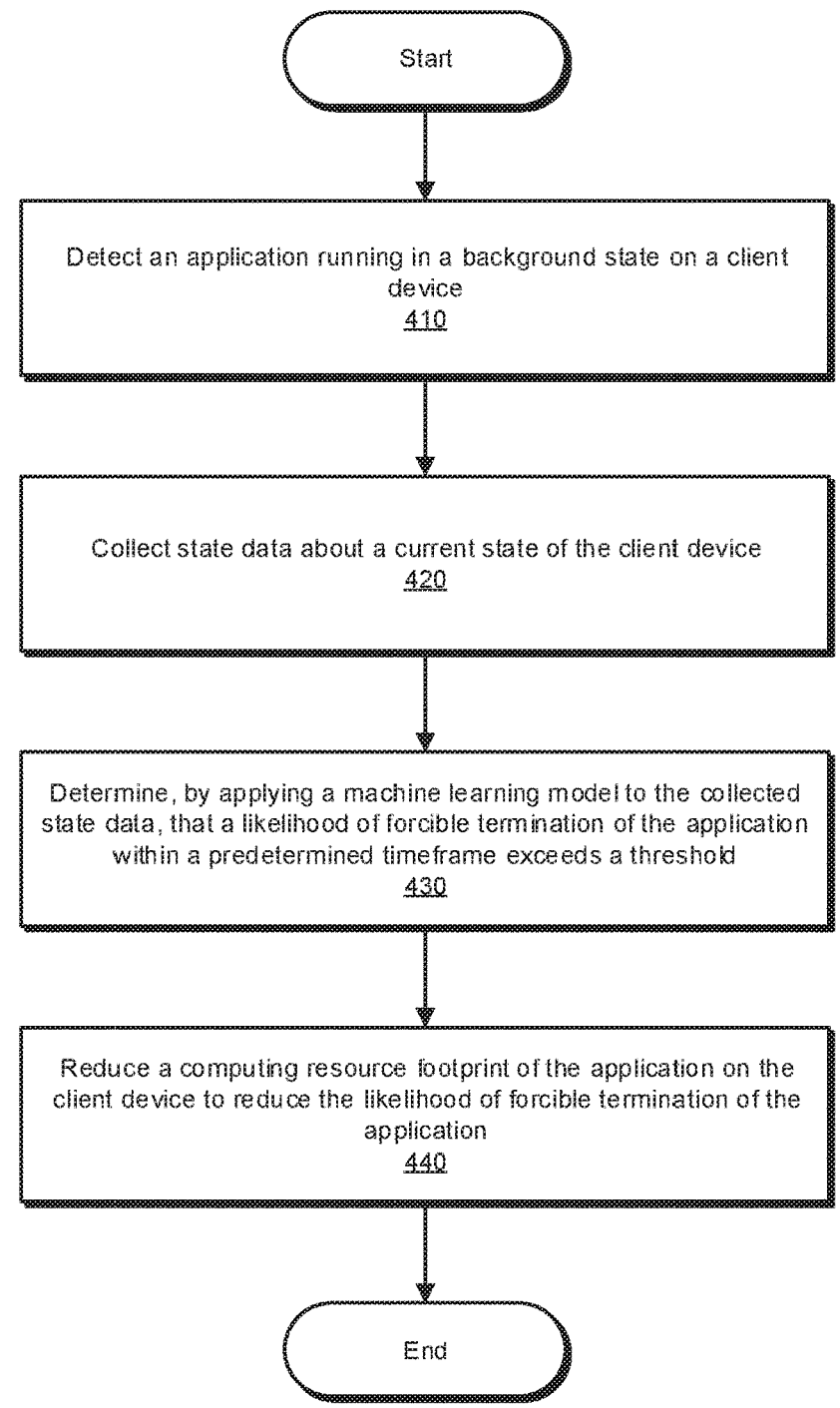
FIG. 4 a flow diagram of an exemplary method for reducing or preventing forced application termination.

Thereafter, the description will provide, with reference to FIG. 4, detailed descriptions of computer-implemented methods for reducing or preventing forced application termination. Detailed descriptions of a corresponding exemplary system will be provided in connection with FIG. 5. Detailed descriptions of an exemplary application moving from an active state to a background state will be provided in connection with FIG. 6. In addition, detailed descriptions of training an exemplary machine learning model using exemplary historical state data will be provided in connection with FIG. 7. Detailed descriptions of exemplary predictions of forcible termination for exemplary applications will be provided in connection with FIG. 8. Furthermore, detailed descriptions of reducing a resource usage to achieve a target state to avoid termination of an application will be provided in connection with FIG. 9. Detailed descriptions of an exemplary updated prediction of forcible termination will be provided in connection with FIG. 10. Finally, detailed descriptions of retraining the machine learning model will be provided in connection with FIG. 11.

FIG. 1 is a block diagram of a content distribution ecosystem 100 that includes a distribution infrastructure 110 in communication with a content player 120. In some embodiments, distribution infrastructure 110 may be configured to encode data and to transfer the encoded data to content player 120 via data packets. Content player 120 may be configured to receive the encoded data via distribution infrastructure 110 and to decode the data for playback to a user. The data provided by distribution infrastructure 110 may include audio, video, text, images, animations, interactive content, haptic data, virtual or augmented reality data, location data, gaming data, or any other type of data that may be provided via streaming.

Distribution infrastructure 110 generally represents any services, hardware, software, or other infrastructure components configured to deliver content to end users. For example, distribution infrastructure 110 may include content aggregation systems, media transcoding and packaging services, network components (e.g., network adapters), and/or a variety of other types of hardware and software. Distribution infrastructure 110 may be implemented as a highly complex distribution system, a single media server or device, or anything in between. In some examples, regardless of size or complexity, distribution infrastructure 110 may include at least one physical processor 112 and at least one memory device 114. One or more modules 116 may be stored or loaded into memory 114 to enable adaptive streaming, as discussed herein.

Content player 120 generally represents any type or form of device or system capable of playing audio and/or video content that has been provided over distribution infrastructure 110. Examples of content player 120 include, without limitation, mobile phones, tablets, laptop computers, desktop computers, televisions, set-top boxes, digital media players, virtual reality headsets, augmented reality glasses, and/or any other type or form of device capable of rendering digital content. As with distribution infrastructure 110, content player 120 may include a physical processor 122, memory 124, and one or more modules 126. Some or all of the adaptive streaming processes described herein may be performed or enabled by modules 126, and in some examples, modules 116 of distribution infrastructure 110 may coordinate with modules 126 of content player 120 to provide adaptive streaming of multimedia content.

In certain embodiments, one or more of modules 116 and/or 126 in FIG. 1 may represent one or more software applications or programs that, when executed by a computing device, may cause the computing device to perform one or more tasks. For example, and as will be described in greater detail below, one or more of modules 116 and 126 may represent modules stored and configured to run on one or more general-purpose computing devices. One or more of modules 116 and 126 in FIG. 1 may also represent all or portions of one or more special-purpose computers configured to perform one or more tasks.

Physical processors 112 and 122 generally represent any type or form of hardware-implemented processing unit capable of interpreting and/or executing computer-readable instructions. In one example, physical processors 112 and 122 may access and/or modify one or more of modules 116 and 126, respectively. Additionally or alternatively, physical processors 112 and 122 may execute one or more of modules 116 and 126 to facilitate adaptive streaming of multimedia content. Examples of physical processors 112 and 122 include, without limitation, microprocessors, microcontrollers, central processing units (CPUs), field-programmable gate arrays (FPGAs) that implement softcore processors, application-specific integrated circuits (ASICs), portions of one or more of the same, variations or combinations of one or more of the same, and/or any other suitable physical processor.

Memory 114 and 124 generally represent any type or form of volatile or non-volatile storage device or medium capable of storing data and/or computer-readable instructions. In one example, memory 114 and/or 124 may store, load, and/or maintain one or more of modules 116 and 126. Examples of memory 114 and/or 124 include, without limitation, random access memory (RAM), read only memory (ROM), flash memory, hard disk drives (HDDs), solid-state drives (SSDs), optical disk drives, caches, variations or combinations of one or more of the same, and/or any other suitable memory device or system.

Figure 2:
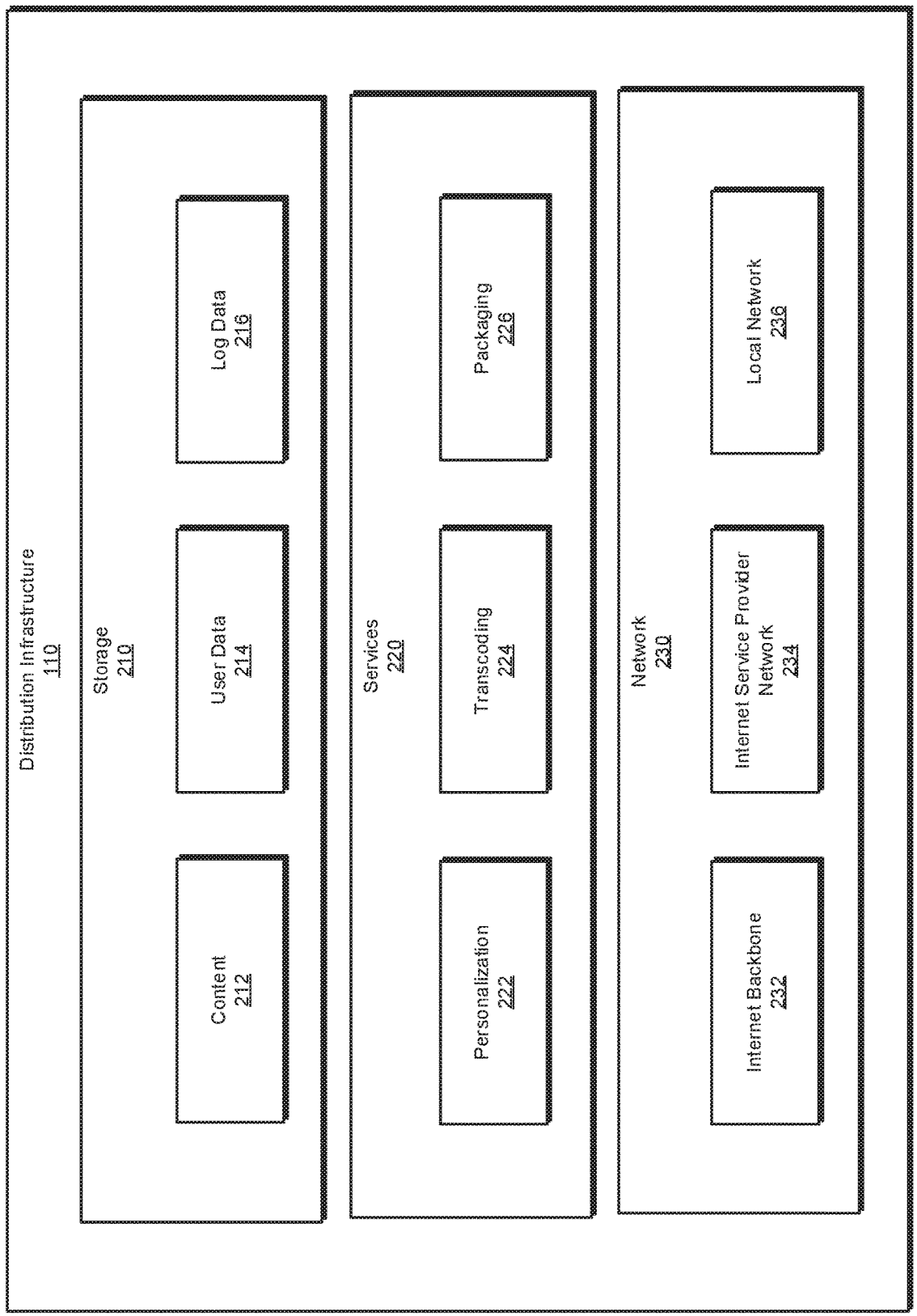
FIG. 2 is a block diagram of an exemplary distribution infrastructure within the content distribution ecosystem shown in FIG. 1.

FIG. 2 is a block diagram of exemplary components of content distribution infrastructure 110 according to certain embodiments. Distribution infrastructure 110 may include storage 210, services 220, and a network 230. Storage 210 generally represents any device, set of devices, and/or systems capable of storing content for delivery to end users. Storage 210 may include a central repository with devices capable of storing terabytes or petabytes of data and/or may include distributed storage systems (e.g., appliances that mirror or cache content at Internet interconnect locations to provide faster access to the mirrored content within certain regions). Storage 210 may also be configured in any other suitable manner.

As shown, storage 210 may store, among other items, content 212, user data 214, and/or log data 216. Content 212 may include television shows, movies, video games, user-generated content, and/or any other suitable type or form of content. User data 214 may include personally identifiable information (PII), payment information, preference settings, language and accessibility settings, and/or any other information associated with a particular user or content player. Log data 216 may include viewing history information, network throughput information, and/or any other metrics associated with a user's connection to or interactions with distribution infrastructure 110.

Services 220 may include personalization services 222, transcoding services 224, and/or packaging services 226. Personalization services 222 may personalize recommendations, content streams, and/or other aspects of a user's experience with distribution infrastructure 110. Encoding services 224 may compress media at different bitrates which may enable real-time switching between different encodings. Packaging services 226 may package encoded video before deploying it to a delivery network, such as network 230, for streaming.

Network 230 generally represents any medium or architecture capable of facilitating communication or data transfer. Network 230 may facilitate communication or data transfer via transport protocols using wireless and/or wired connections. Examples of network 230 include, without limitation, an intranet, a wide area network (WAN), a local area network (LAN), a personal area network (PAN), the Internet, power line communications (PLC), a cellular network (e.g., a global system for mobile communications (GSM) network), portions of one or more of the same, variations or combinations of one or more of the same, and/or any other suitable network. For example, as shown in FIG. 2, network 230 may include an Internet backbone 232, an internet service provider 234, and/or a local network 236.

Figure 3:
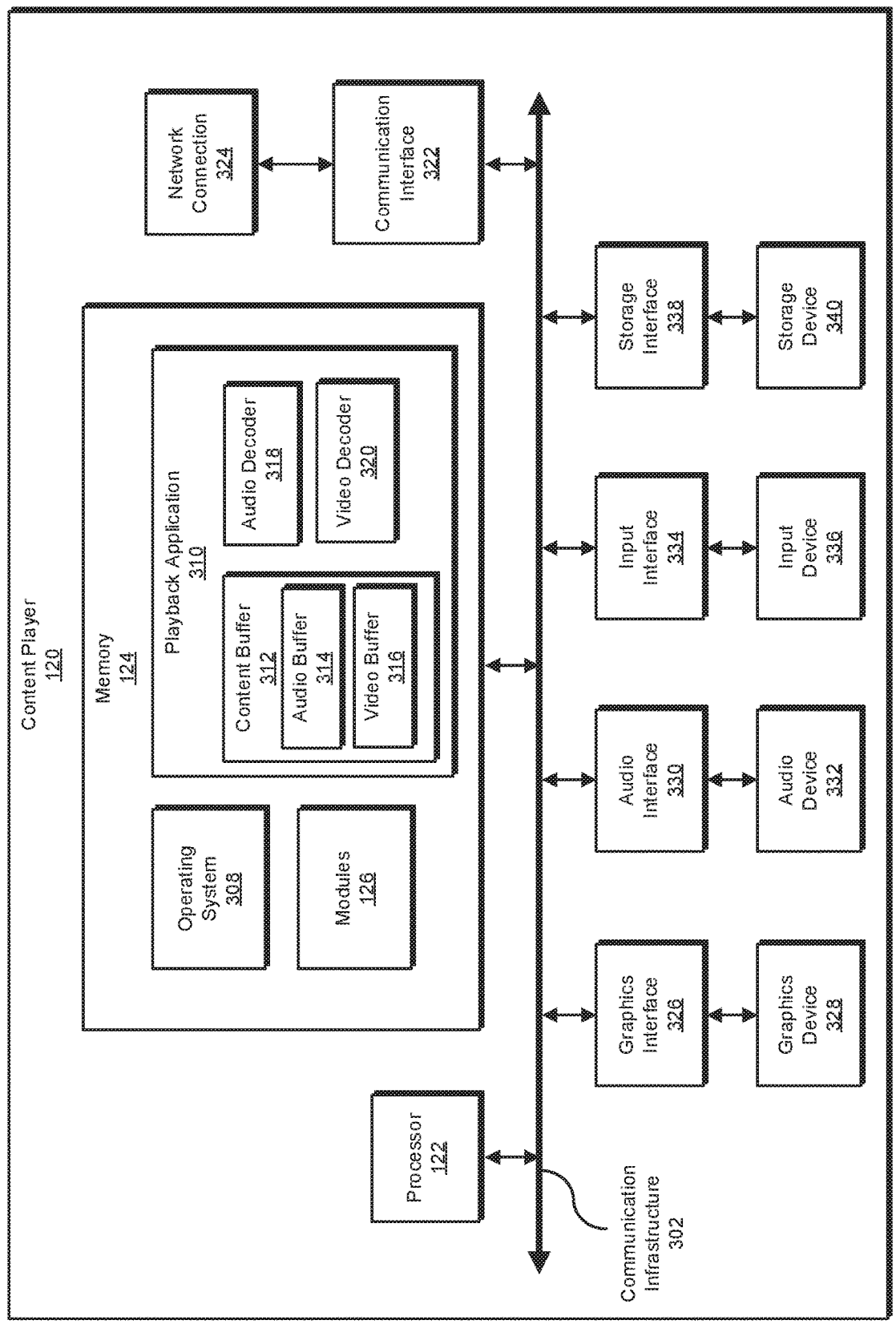
FIG. 3 is a block diagram of an exemplary content player within the content distribution ecosystem shown in FIG. 1.

FIG. 3 is a block diagram of an exemplary implementation of content player 120 of FIG. 1. Content player 120 generally represents any type or form of computing device capable of reading computer-executable instructions. Content player 120 may include, without limitation, laptops, tablets, desktops, servers, cellular phones, multimedia players, embedded systems, wearable devices (e.g., smart watches, smart glasses, etc.), smart vehicles, gaming consoles, internet-of-things (IoT) devices such as smart appliances, variations or combinations of one or more of the same, and/or any other suitable computing device.

As shown in FIG. 3, in addition to processor 122 and memory 124, content player 120 may include a communication infrastructure 302 and a communication interface 322 coupled to a network connection 324. Content player 120 may also include a graphics interface 326 coupled to a graphics device 328, an input interface 334 coupled to an input device 336, and a storage interface 338 coupled to a storage device 340.

Communication infrastructure 302 generally represents any type or form of infrastructure capable of facilitating communication between one or more components of a computing device. Examples of communication infrastructure 302 include, without limitation, any type or form of communication bus (e.g., a peripheral component interconnect (PCI) bus, PCI Express (PCIe) bus, a memory bus, a frontside bus, an integrated drive electronics (IDE) bus, a control or register bus, a host bus, etc.).

As noted, memory 124 generally represents any type or form of volatile or non-volatile storage device or medium capable of storing data and/or other computer-readable instructions. In some examples, memory 124 may store and/or load an operating system 308 for execution by processor 122. In one example, operating system 308 may include and/or represent software that manages computer hardware and software resources and/or provides common services to computer programs and/or applications on content player 120.

Operating system 308 may perform various system management functions, such as managing hardware components (e.g., graphics interface 326, audio interface 330, input interface 334, and/or storage interface 338). Operating system 308 may also process memory management models for playback application 310. The modules of playback application 310 may include, for example, a content buffer 312, an audio decoder 318, and a video decoder 320.

Playback application 310 may be configured to retrieve digital content via communication interface 322 and play the digital content through graphics interface 326. A video decoder 320 may read units of video data from video buffer 316 and may output the units of video data in a sequence of video frames corresponding in duration to the fixed span of playback time. Reading a unit of video data from video buffer 316 may effectively de-queue the unit of video data from video buffer 316. The sequence of video frames may then be rendered by graphics interface 326 and transmitted to graphics device 328 to be displayed to a user.

In situations where the bandwidth of distribution infrastructure 110 is limited and/or variable, playback application 310 may download and buffer consecutive portions of video data and/or audio data from video encodings with different bit rates based on a variety of factors (e.g., scene complexity, audio complexity, network bandwidth, device capabilities, etc.). In some embodiments, video playback quality may be prioritized over audio playback quality. Audio playback and video playback quality may also be balanced with each other, and in some embodiments audio playback quality may be prioritized over video playback quality.

Content player 120 may also include a storage device 340 coupled to communication infrastructure 302 via a storage interface 338. Storage device 340 generally represent any type or form of storage device or medium capable of storing data and/or other computer-readable instructions. For example, storage device 340 may be a magnetic disk drive, a solid-state drive, an optical disk drive, a flash drive, or the like. Storage interface 338 generally represents any type or form of interface or device for transferring data between storage device 340 and other components of content player 120.

Many other devices or subsystems may be included in or connected to content player 120. Conversely, one or more of the components and devices illustrated in FIG. 3 need not be present to practice the embodiments described and/or illustrated herein. The devices and subsystems referenced above may also be interconnected in different ways from that shown in FIG. 3. Content player 120 may also employ any number of software, firmware, and/or hardware configurations.

FIG. 4 is a flow diagram of an exemplary computer-implemented method 400 for reducing or preventing forced application termination. The steps shown in FIG. 4 may be performed by any suitable computer-executable code and/or computing system, including the systems illustrated in FIGS. 1-3 and a client device 502 in FIG. 5. In one example, each of the steps shown in FIG. 4 may represent an algorithm whose structure includes and/or is represented by multiple sub-steps, examples of which will be provided in greater detail below.

Figure 5:
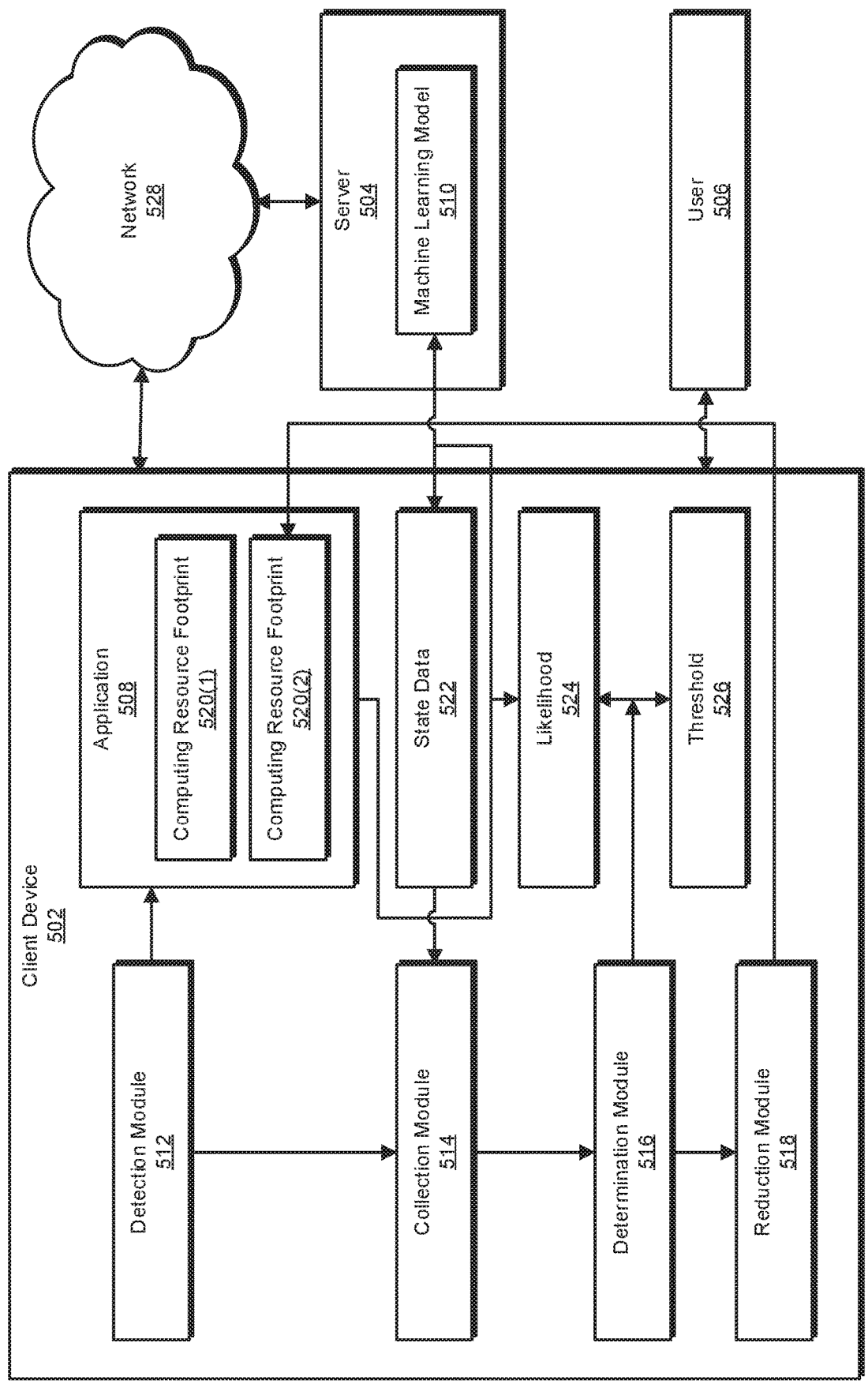
FIG. 5 is a block diagram of an exemplary system with an exemplary client device for reducing or preventing forced application termination.

As illustrated in FIG. 4, at step 410, one or more of the systems described herein may detect an application running in a background state on a client device. For example, FIG. 5 is a block diagram of an exemplary system for reducing or preventing forced application termination. As illustrated in FIG. 5, a detection module 512 may, as part of client device 502, detect an application 508 running in a background state on client device 502.

In some embodiments, client device 502 may generally represent any type or form of computing device capable of capturing and/or transmitting video data. Examples of client device 502 may include, without limitation, laptops, tablets, desktops, servers, cellular phones, Personal Digital Assistants (PDAs), multimedia players, embedded systems, wearable devices (e.g., smart watches, smart glasses, etc.), gaming consoles, combinations of one or more of the same, or any other suitable computing device. In these embodiments, client device 502 may be directly in communication with a server 504 and/or in communication via a network 528. In some examples, the term "network" may refer to any medium or architecture capable of facilitating communication or data transfer. Examples of networks include, without limitation, an intranet, a Wide Area Network (WAN), a Local Area Network (LAN), a Personal Area Network (PAN), the Internet, Power Line Communications (PLC), a cellular network (e.g., a Global System for Mobile Communications (GSM) network), or the like. For example, the network may facilitate data transfer between client device 502 and server 504 using wireless or wired connections.

Server 504 may generally represent any type or form of computing device that is capable of storing and/or managing data, such as training and/or storing machine learning model 510. Examples of server 504 include, without limitation, application servers and database servers configured to provide various database services and/or run certain software applications. Additionally, client device 502 and/or server 504 may include content player 120 in FIGS. 1 and 3 and/or various other components of FIGS. 1-2.

As used herein, the term "application" generally refers to a software program designed to perform specific functions or tasks and capable of being installed, deployed, executed, and/or otherwise implemented on a computing system. Examples of applications may include, without limitation, playback application 310 of FIG. 3, productivity software, enterprise software, entertainment software, security applications, cloud-based applications, web applications, mobile applications, content access software, simulation software, integrated software, application packages, application suites, variations or combinations of one or more of the same, and/or any other suitable software application.

The systems described herein may perform step 410 in a variety of ways. In one example, the background state of application 508 may include a closed state of application 508. Additionally, during the background state, application 508 may use one or more computing resources of client device 502. Additionally, detection module 512 may detect the background state of application 508 by detecting a closing of application 508 and monitoring a continued background process of application 508 after closing.

Figure 6:
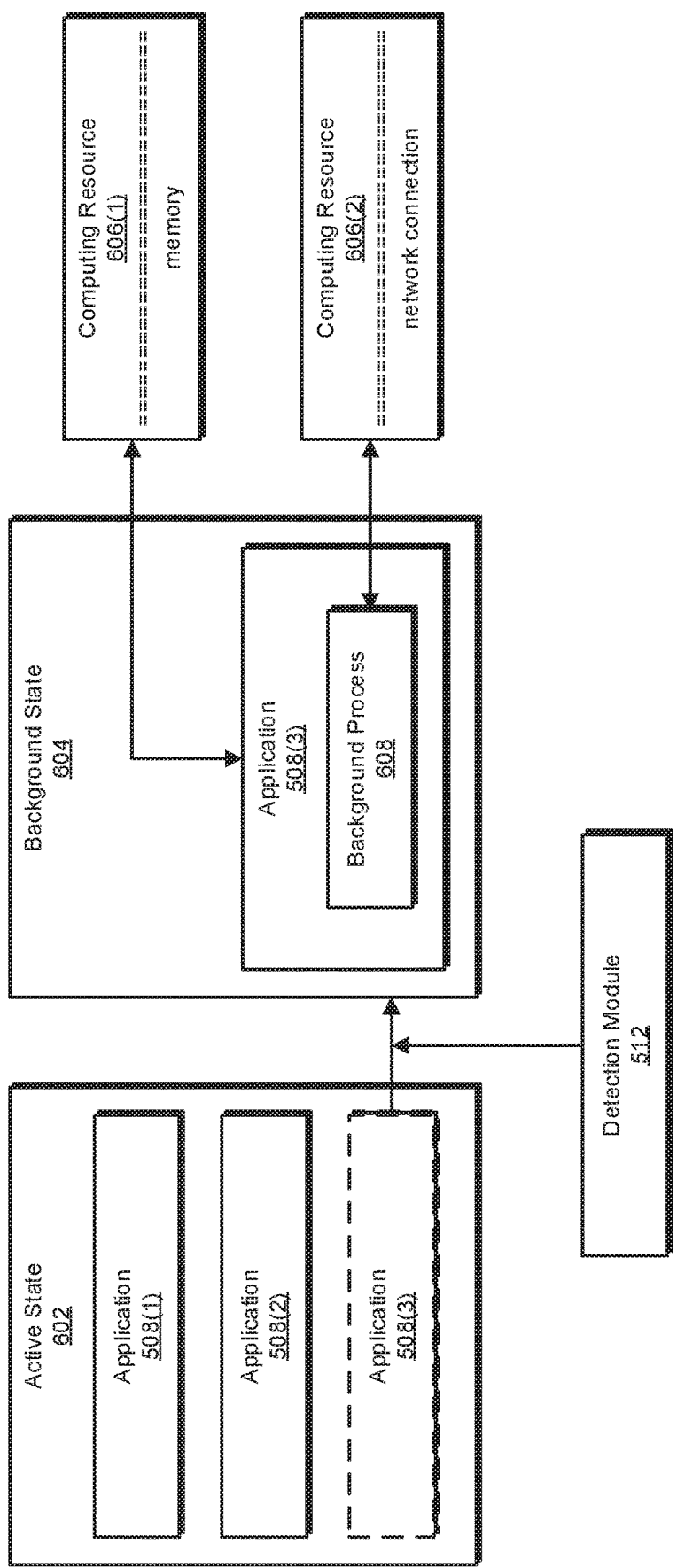
FIG. 6 is a block diagram of an exemplary application moving from an active state to a background state.

FIG. 6 illustrates an application 508(3) moving from an active state 602 to a background state 604. In this example, applications 508(1)-(2) may remain in active state 602 while a user, such as user 506 of FIG. 5, may close application 508(3). Additionally, in this example, application 508(3) may continue to run a background process 608 that uses a computing resource 606(2) (e.g., a network connection). Application 508(3) may additionally continue to use a computing resource 606(1) (e.g., a memory). By detecting a closing of application 508(3), detection module 512 may initiate the systems and methods disclosed herein to prevent (or reduce the likelihood of) forcible termination of application 508(3).

Returning to FIG. 4, at step 420, one or more of the systems described herein may collect state data about a current state of the client device. For example, a collection module 514 may, as part of client device 502 in FIG. 5, collect state data 522 about the current state of client device 502.

The systems described herein may perform step 420 in a variety of ways. In some embodiments, state data 522 may include a state of a memory of client device 502, a battery of client device 502, a processor of client device 502, a network connection of client device 502, an operating system of client device 502, application 508, and/or a second application running on client device 502. For example, state data 522 may measure the capacity and/or usage of device memory and/or the CPU of client device 502. Additionally, state data 522 may measure the usage of resources by application 508 and/or other applications on client device 502. Furthermore, state data 522 may measure the amount of time that application 508 has been running on client device 502.

Figure 7:
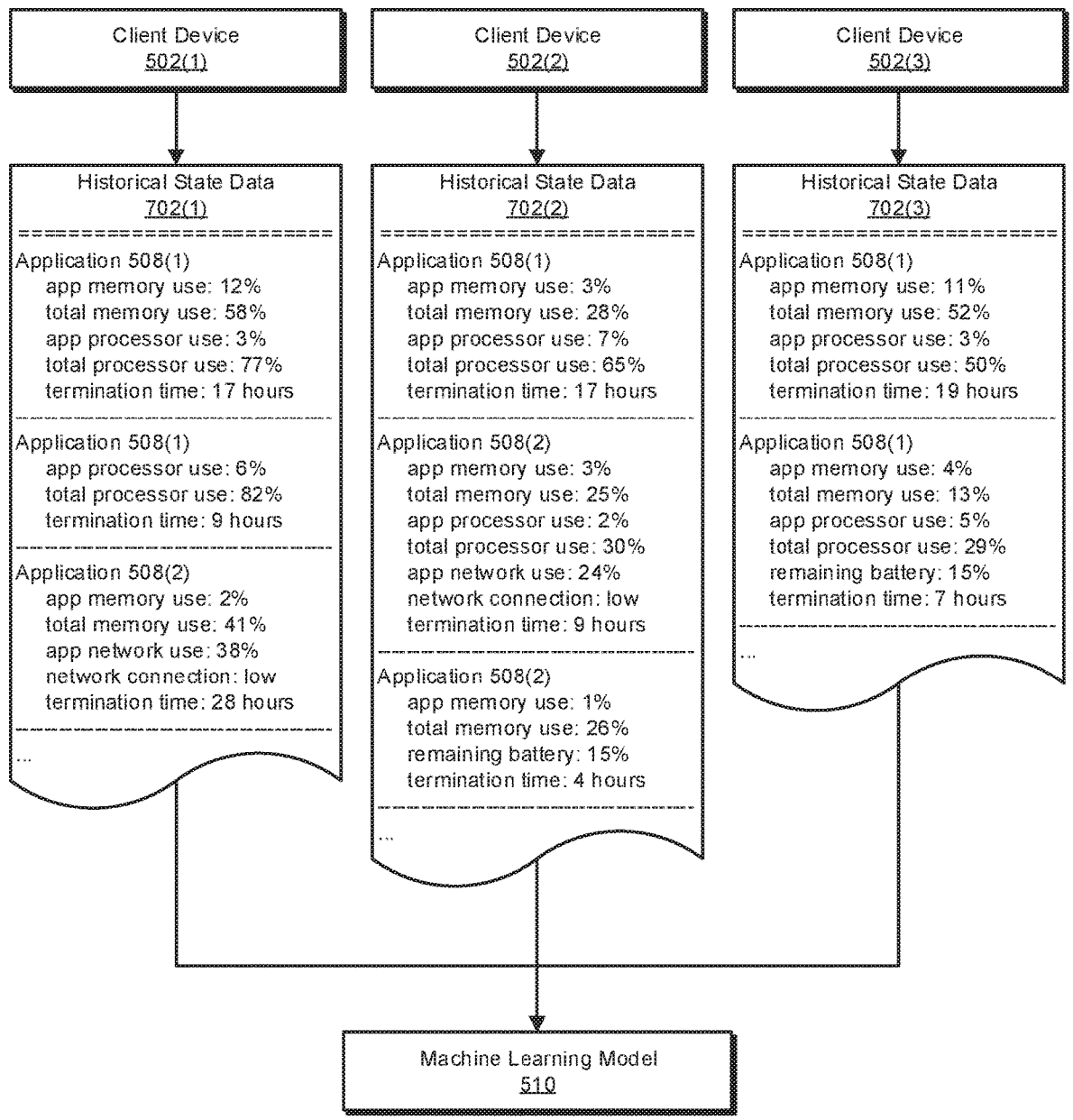
FIG. 7 illustrates a training of an exemplary machine learning model using exemplary historical state data.

FIG. 7 illustrates an exemplary machine learning model 510 trained using exemplary historical state data 702(1)-(3) collected from client devices 502(1)-(3), respectively. As shown in FIG. 7, historical state data 702(1)-(3) may include data on instances of termination of application 508(1) and application 508(2) as well as the state of client devices 502(1)-(3) when each instance of termination occurred. In other examples, additional data may include termination of other applications and/or state data about other applications at the time of a termination. For example, multiple applications may be simultaneously terminated due to a stricter constraint on background use of resources.

In some embodiments, such as the example of FIG. 5, collection module 514 may represent a client-side module on client device 502 that sends collected state data 522 to server 504, which may be used to improve the historical state data. Additionally or alternatively, collection module 514 may represent a server-side module on server 504 that requests state data 522 from client device 502.

Returning to FIG. 4, at step 430, one or more of the systems described herein may determine, by applying a machine learning model to the collected state data, that a likelihood of forcible termination of the application within a predetermined timeframe exceeds a threshold. For example, a determination module 516 may, as part of client device 502 in FIG. 5, determine that a likelihood 524 of forcible termination of application 508 within a predetermined timeframe exceeds a threshold 526 by applying machine learning model 510 to state data 522.

As used herein, the term "machine learning" generally refers to a computational algorithm that may learn from data in order to make predictions. Examples of machine learning may include, without limitation, support vector machines, neural networks, clustering, decision trees, regression analysis, classification, variations or combinations of one or more of the same, and/or any other suitable supervised, semi-supervised, or unsupervised methods. The term "machine learning model," as used herein, generally refers to a model built using machine learning methods.

The systems described herein may perform step 430 in a variety of ways. In some embodiments, such as the example of FIG. 7, machine learning model 510 may include a model trained using historical state data 702(1)-(3) of client devices 502(1)-(3). In these embodiments, historical state data 702(1)-(3) may include a historical record of forcible termination of application 508(1) and/or application 508(2). Additionally, each factor of historical state data 702(1)-(3) (i.e., "app memory use" and "total processor use") may be formatted into features for training machine learning model 510. The term "feature," as used herein, generally refers to a value or vector derived from data that enables it to be measured and/or interpreted as part of a machine learning method. Examples of features may include numerical data that quantizes a factor, textual data used in pattern recognition, graphical data, or any other format of data that may be analyzed using statistical methods or machine learning.

By training machine learning model 510 using historical data, the systems and methods described herein may identify a likely threshold between whether application 508 of FIG. 5 will be terminated or permitted to continue running in the background. By applying machine learning model 510 to current state data 522, determination module 516 may then calculate likelihood 524 of forced termination within a timeframe and compare likelihood 524 with threshold 526 to determine whether likelihood 524 is high enough to take further action. In some examples, the predetermined timeframe may include an amount of time determined to be sufficient to reduce resource use prior to an operating system deciding to terminate application 508.

In some examples, machine learning model 510 may be further tailored to each application, each client device, and/or a user of each client device. For example, machine learning model 510 may be tailored to predict forced termination of application 508(1) when running on devices similar to client device 502(1), which may have the same operating system. Alternatively, machine learning model 510 may be generally applicable to various applications and/or client devices.

In one embodiment, machine learning model 510 may be trained by a client device, such as client device 502(1) of FIG. 7, using only historical state data for the client device, such as historical state data 702(1). By limiting data to historical data specific to the client device, machine learning model 510 may be better tailored to the client device and more easily updated. In other embodiments, such as the example of FIG. 5, machine learning model 510 may be trained by server 504 using historical state data of multiple client devices, such as historical state data 702(1)-(3). By collecting data from multiple client devices, machine learning model 510 may be more robust and/or generalizable. In these embodiments, server 504 may then send machine learning model 510 to client device 502 to apply to state data 522.

In some examples, forcible termination of application 508 may include an automated termination of one or more background processes of application 508 by the operating system and/or another management application of client device 502. For example, the operating system of client device 502 may terminate background process 608 of FIG. 6 to free up network bandwidth by reducing use of computing resource 606(2). In these examples, the operating system may identify heavily used resources and terminate background processes that use these resources. Additionally, the operating system may terminate all processes of the associated applications, effectively killing the applications.

Figure 8:
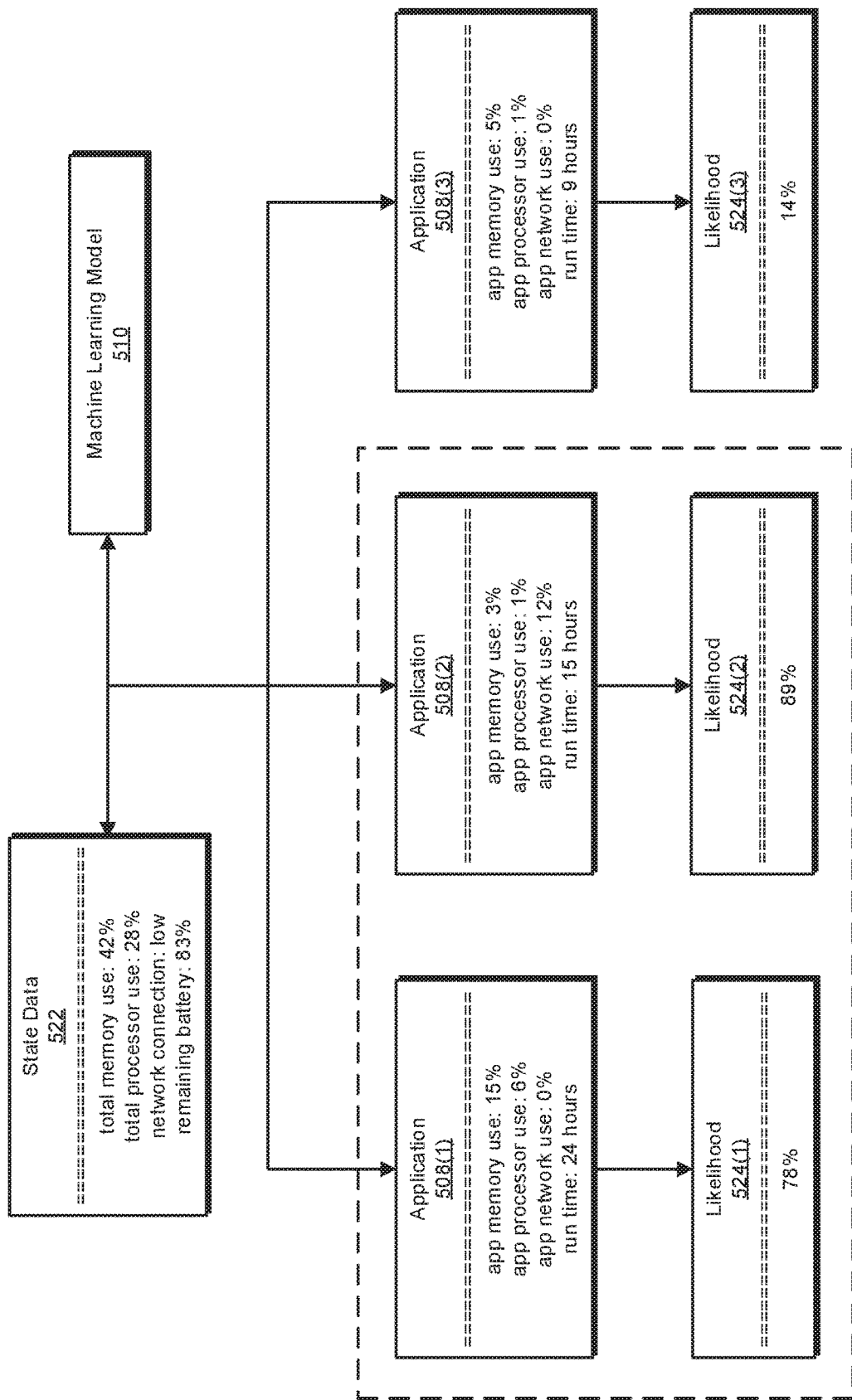
FIG. 8 is a block diagram of exemplary predictions of forcible termination for exemplary applications.

FIG. 8 illustrates exemplary predictions of forcible termination for applications 508(1) and 508(2). As shown in FIG. 8, after applying machine learning model 510 to state data 522, determination module 516 of FIG. 5 may calculate likelihoods 524(1)-(3) of termination of applications 508(1)-(3), respectively. Determination module 516 may then determine that likelihood 524(1) and likelihood 524(2) exceed threshold 526, resulting in a predicted forcible termination 802 of applications 508(1) and 508(2). In this example, the operating system may be likely to terminate applications with higher memory use, with higher network use, and/or that have run longer in the background.

Returning to FIG. 4, at step 440, one or more of the systems described herein may reduce a computing resource footprint of the application on the client device to reduce the likelihood of forcible termination of the application. For example, a reduction module 518 may, as part of client device 502 in FIG. 5, reduce a computing resource footprint 520(2) to reduce likelihood 524 of forcible termination of application 508.

The systems described herein may perform step 440 in a variety of ways. In one example, reducing computing resource footprint 520(2) may include reducing usage of a memory cache, terminating a process of application 508, reducing a size of application 508, and/or terminating usage of a computing resource, such as computing resource 606(2). Additionally or alternatively, reducing computing resource footprint 520(2) may include identifying a target state of client device 502 with a target likelihood of forcible termination of application 508 that does not exceed threshold 526. Reduction module 518 may then reduce computing resource footprint 520(2) to achieve the target state. In the example of FIG. 5, a computing resource footprint 520(1) may be smaller and less likely to contribute to higher likelihood 524 of termination, and reducing computing resource footprint 520(1) may not reach the target likelihood.

In some embodiments, reduction module 518 may determine computing resource footprint 520(2) is older and less likely to be used if application 508 is reopened. For example, computing resource footprint 520(2) may represent a search history stored in memory that is older than a search history of computing resource footprint 520(1). Additionally, reduction module 518 may reduce computing resource footprint 520(2) to reduce likelihood 524 of terminating application 508 in comparison to potential forced termination of other applications.

Figure 9:
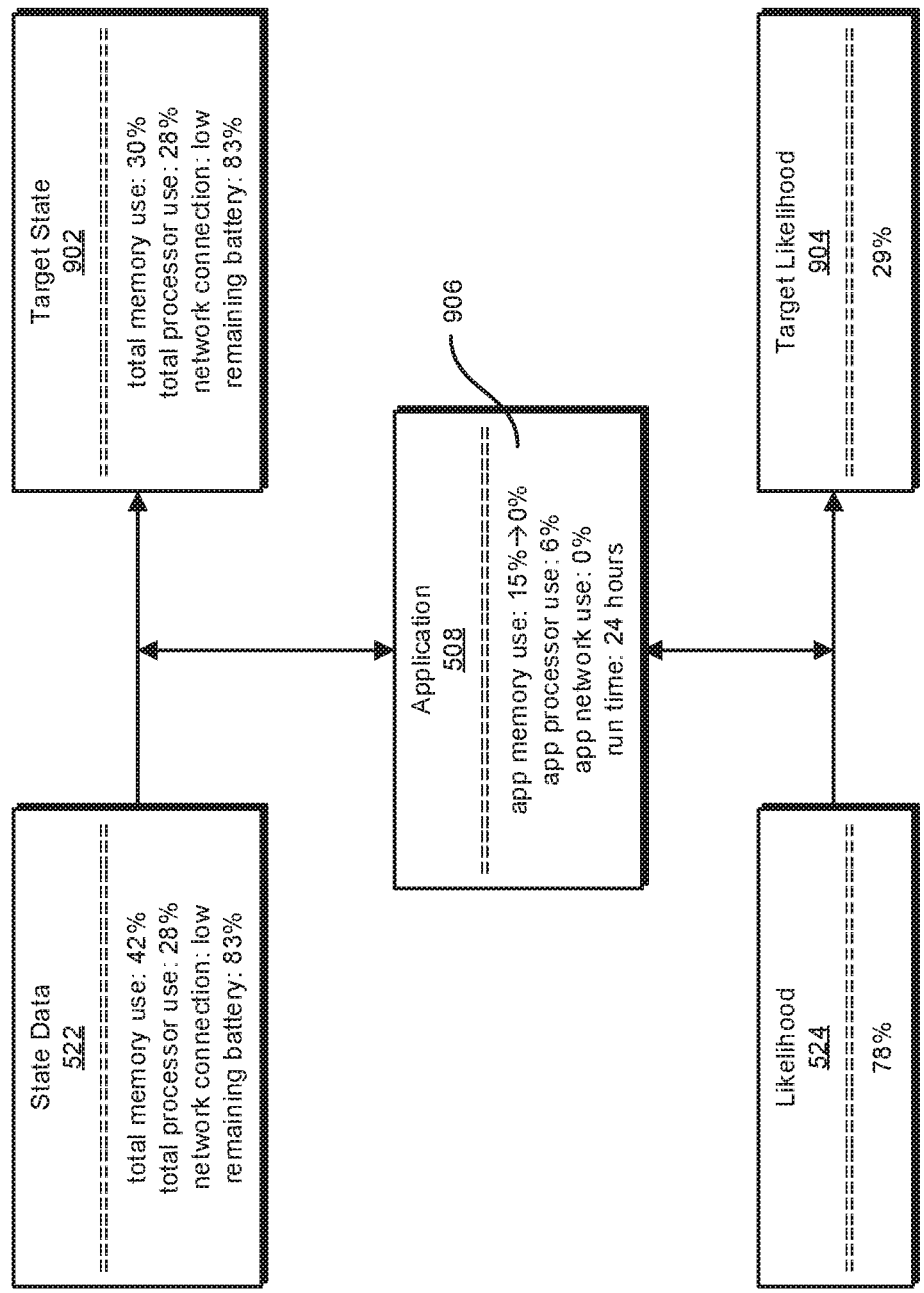
FIG. 9 is a block diagram of an exemplary reduction of a resource usage to achieve a target state.

FIG. 9 illustrates an exemplary reduction 906 of a resource usage to achieve a target state 902. In this example, reduction module 518 may determine target state 902 has a lower memory use compared to current state data 522. Reduction module 518 may then clear the memory cache of application 508 to reduce likelihood 524 of forced termination (e.g., 78%) to a target likelihood 904 of forced termination (e.g., 29%). In other examples, reduction 906 may include terminating a background process that uses the memory of client device 502.

By reducing the resource usage to achieve target state 902, reduction module 518 may decrease likelihood 524 of forced termination to avoid potentially triggering a termination of application 508. Additionally, by identifying the memory cache as the resource likely to trigger the termination, reduction module 518 may reduce only the usage of the memory without reducing the usage of other resources. In other examples, usage of other resources may be determined to trigger forced termination, and reduction module 518 may reduce the usage of the other resources while maintaining usage of the memory cache. In these examples, the disclosed systems may attempt to maintain in memory as many resources as possible without triggering a forced termination.

In one embodiment, determination module 516 may determine that likelihood 524 of forcible termination of application 508 within the predetermined timeframe does not exceed threshold 526. In this example, reduction module 518 may suspend reduction 906 of the computing resource footprint. For example, likelihood 524(3) in FIG. 8 may be lower than threshold 526, and reduction module 518 may not need to reduce usage of computing resources by application 508(3) as the application is not likely to be terminated (e.g., by the operating system).

Figure 10:
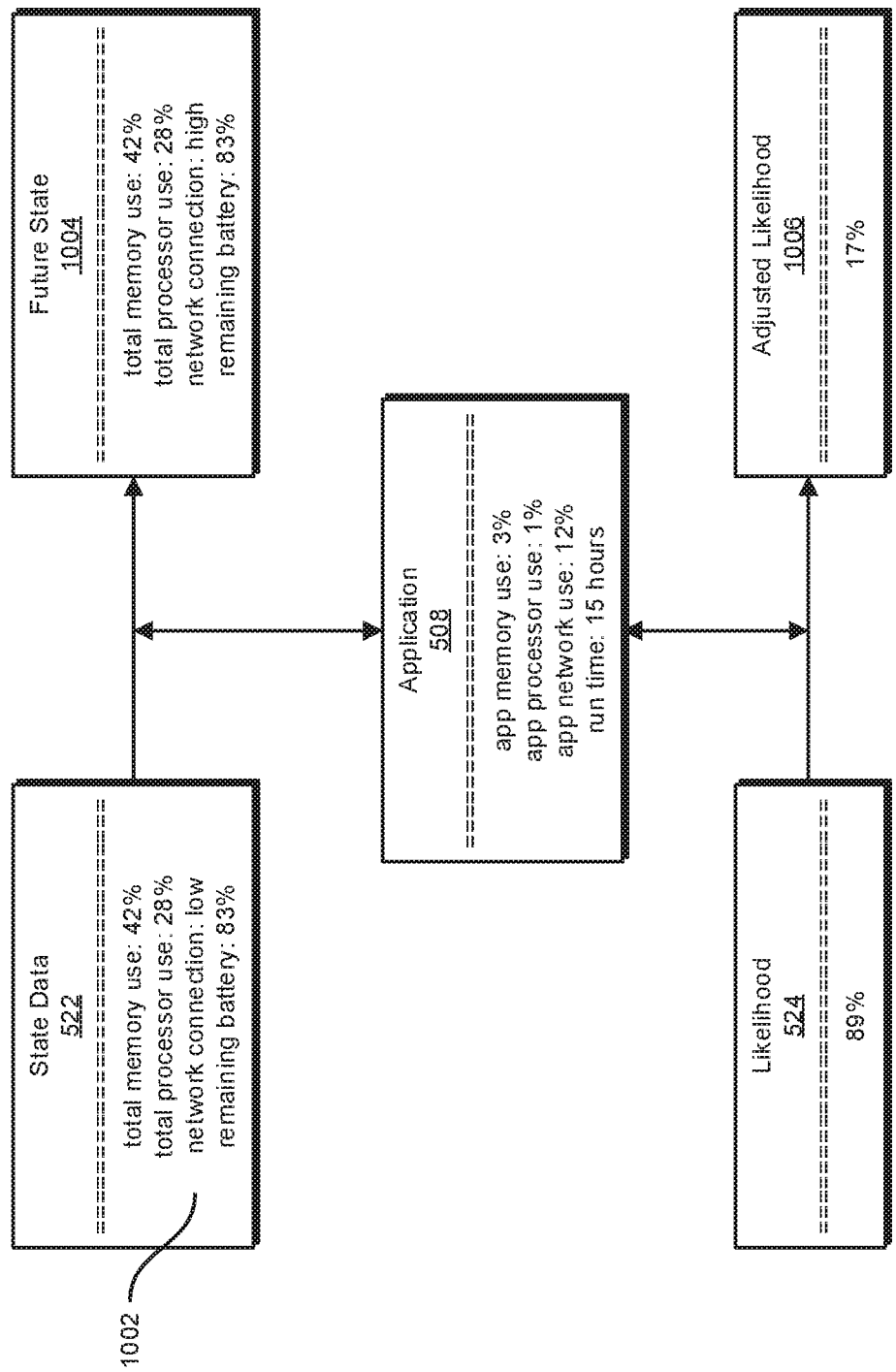
FIG. 10 is a block diagram of an exemplary updated prediction of forcible termination for an exemplary application.

The above described systems may further detect a change in the current state of client device 502 and adjust likelihood 524 of forcible termination of application 508 based on the change. Additionally, the above described system may predict a future state of client device 502 based on the change in the current state. For example, FIG. 10 illustrates an exemplary updated prediction of forcible termination for application 508 based on a change 1002 in state data 522. In this example, client device 502 may move from a lower bandwidth network to a more stable, high bandwidth network. Detection module 512 may detect change 1002 and predict a future state 1004 with higher network bandwidth. Determination module 516 may subsequently adjust likelihood 524 (e.g., 89%) to an adjusted likelihood 1006 (e.g., 17%) due to a lower likelihood of termination after the network connection improves. The reduction module 518 may then take action, including reducing client device resource usage (or avoid taking action), based on the adjusted likelihood 1006.

In some examples, the above described systems may further include detecting a forcible termination of application 508 within the predetermined timeframe and updating historical data with collected state data 522 and the forcible termination. The above described systems may then retrain machine learning model 510 with the updated historical data.

Figure 11:
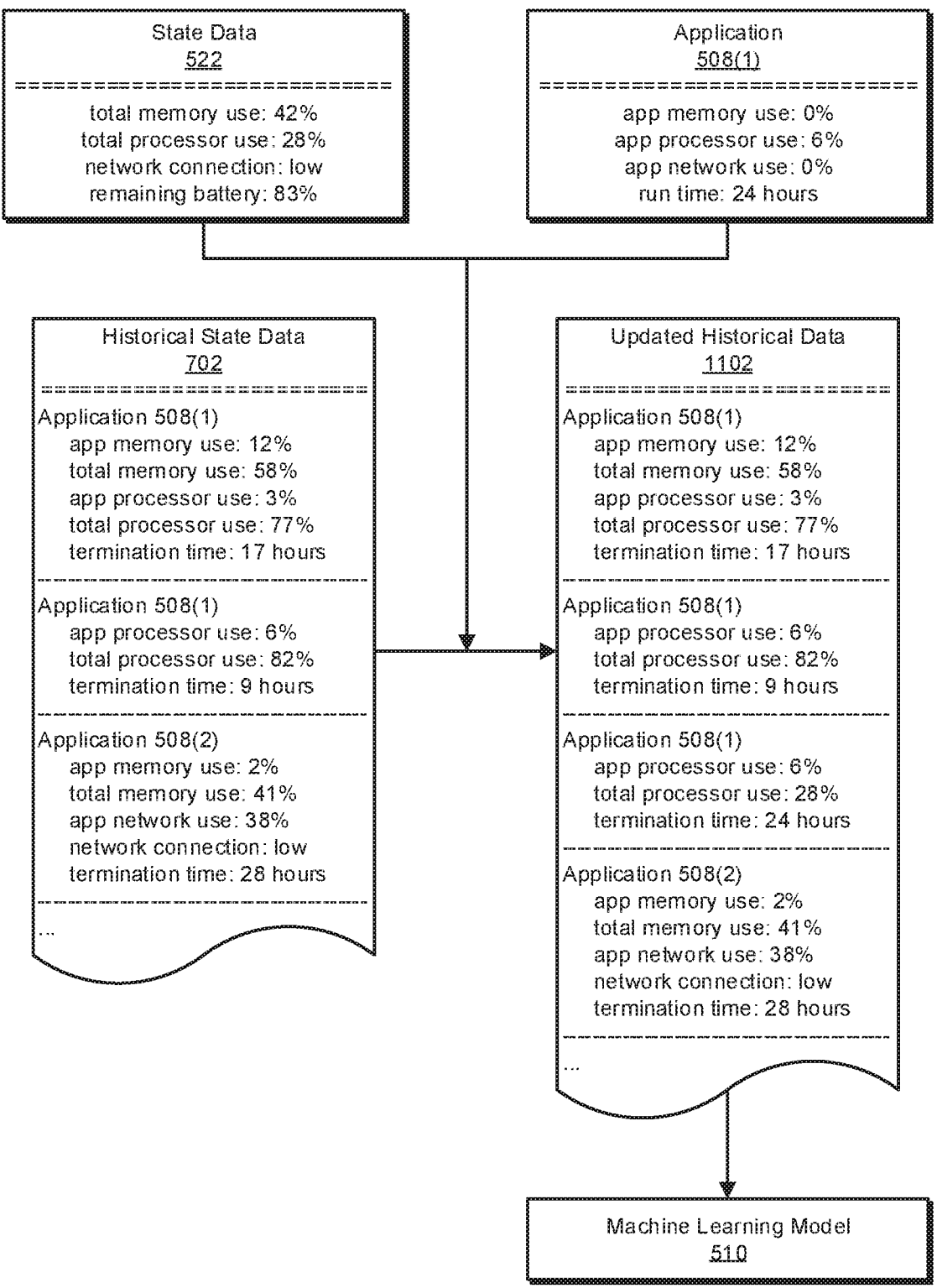
FIG. 11 illustrates an exemplary retraining of a machine learning model.

For example, FIG. 11 illustrates the addition of state data 522 and a termination of application 508(1) to historical state data 702 to create updated historical data 1102. In this example, machine learning model 510 may have incorrectly predicted a low likelihood of termination of application 508(1), or a reduction of the selected computing resource footprints may not have successfully prevented (or delayed) the termination of application 508(1). Thus, in the example of FIG. 5, server 504 may retrain machine learning model 510 using updated historical data 1102 to improve the model for future use in preventing forced application termination. In other examples, machine learning model 510 may be periodically retrained using updated client data to provide the most accurate and current predictions of forcible termination. Again, reduction module 518 may take action, including reducing client device resource usage (or avoid taking action), based on the output of the retrained machine learning model 510.

By continually updating historical state data 702 and retraining machine learning model 510, the above described systems may improve predictions of forced termination to enable application 508 to maintain usage of computing resources for as long as possible. For example, retraining machine learning model 510 may improve the timing of predictions to permit background process 608 of FIG. 6 to run for a longer period of time before being reduced to prevent forced termination. By permitting resources to be used for a longer period of time, the disclosed systems may increase the likelihood that the resource usage survives until application 508 is reopened by user 506. Thus, machine learning model 510 may be retrained with updated historical data 1102 to improve predictions of forced termination to enable background usage of resources to continue longer without being reduced or forcibly terminated.

As explained above in connection with method 400 in FIG. 4, the disclosed systems and methods may, by training a machine learning model to predict forced termination of applications, prevent the termination by reducing the appropriate footprints of the applications. Specifically, the disclosed systems and methods may first identify applications that are running in background states. The disclosed systems and methods may then analyze the current state of a client device and compare it to the trained machine learning model to calculate a likelihood of an application and/or process of the application being forcibly terminated. For example, the systems and methods described herein may train the machine learning model to recognize patterns in historical data on forced terminations of applications and use these patterns to determine whether a current background application is likely to be terminated. The machine learning model may recognize characteristics of the state of a client device that suggests applications may be terminated.

Additionally, the systems and methods described herein may then identify computing resources used by the application that may contribute to a higher likelihood of forced termination. The disclosed systems and methods may then reduce the use of those computing resources to achieve a target state unlikely to result in termination of the application. Thus, the systems and methods described herein may preemptively prevent the forced termination of the application. By applying machine learning to predict when an application may be forcibly terminated, the disclosed systems and methods may enable the application to continue running background processes rather than prematurely ending them to avoid forced termination. Thus, the systems and methods described herein may improve the management of resources for an application to prevent forced termination in a background state and enable the application to function more optimally and for a longer period of time.

Example Embodiments

1. A computer-implemented method comprising: detecting an application running in a background state on a client device; collecting state data about a current state of the client device; determining, by applying a machine learning model to the collected state data, that a likelihood of forcible termination of the application within a predetermined timeframe exceeds a threshold; and reducing a computing resource footprint of the application on the client device to reduce the likelihood of forcible termination of the application.

2. The method of claim 1, wherein the background state comprises a closed state of the application and a use of at least one computing resource of the client device by the application.

3. The method of claim 1, wherein the state data comprises a state of at least one of: a memory, a battery, a processor, a network connection, an operating system, the application, and/or a second application.

4. The method of claim 3, wherein the machine learning model comprises a model trained using at least one of: historical state data of the client device, historical state data of a second client device, a historical record of forcible termination of the application, and/or a historical record of forcible termination of the second application.

5. The method of claim 3, wherein forcible termination comprises an automated termination of at least one background process of the application by the operating system of the client device.

6. The method of claim 1, wherein reducing the computing resource footprint comprises at least one of: reducing usage of a memory cache, terminating a process of the application, reducing a size of the application, and/or terminating usage of a computing resource.

7. The method of claim 1, wherein reducing the computing resource footprint to reduce the likelihood of forcible termination of the application comprises identifying a target state of the client device with a target likelihood of forcible termination of the application that does not exceed the threshold and reducing the computing resource footprint to achieve the target state of the client device.

8. The method of claim 1, further comprising detecting a change in the current state of the client device and adjusting the likelihood of forcible termination of the application based on the change.

9. The method of claim 8, further comprising predicting a future state of the client device based on the change in the current state of the client device.

10. The method of claim 1, further comprising detecting a forcible termination of the application within the predetermined timeframe and updating historical data with the collected state data and the forcible termination.

11. The method of claim 10, further comprising retraining the machine learning model with the updated historical data.

12. A system comprising: a detection module, stored in memory, that detects an application running in a background state on a client device; a collection module, stored in memory, that collects state data about a current state of the client device; a determination module, stored in memory, that determines, by applying a machine learning model to the collected state data, that a likelihood of forcible termination of the application within a predetermined timeframe exceeds a threshold; a reduction module, stored in memory, that reduces a computing resource footprint of the application on the client device to reduce the likelihood of forcible termination of the application; and at least one processor that executes the detection module, the collection module, the determination module, and the reduction module.

13. The system of claim 12, wherein the detection module detects the background state of the application by detecting a closing of the application and monitoring a continued background process of the application after the closing of the application.

14. The system of claim 12, wherein the collection module comprises at least one of: a client module on the client device that sends the collected state data to a server and/or a server module on the server that requests the collected state data from the client device.

15. The system of claim 14, wherein the machine learning model is trained by at least one of: the client device using historical state data of the client device and/or the server using historical state data of multiple client devices.

16. The system of claim 14, wherein the server sends the machine learning model to the client device.

17. The system of claim 12, wherein the machine learning model is tailored to at least one of: the application, the client device, and/or a user of the client device.

18. The system of claim 12, wherein the determination module determines that the likelihood of forcible termination of the application within the predetermined timeframe does not exceed the threshold.

19. The system of claim 18, wherein the reduction module suspends a reduction of the computing resource footprint based on determining the likelihood of forcible termination does not exceed the threshold.

20. A computer-readable medium comprising one or more computer-executable instructions that, when executed by at least one processor of a computing device, cause the computing device to: detect an application running in a background state on a client device; collect state data about a current state of the client device; determine, by applying a machine learning model to the collected state data, that a likelihood of forcible termination of the application within a predetermined timeframe exceeds a threshold; and reduce a computing resource footprint of the application on the client device to reduce the likelihood of forcible termination of the application.

As detailed above, the computing devices and systems described and/or illustrated herein broadly represent any type or form of computing device or system capable of executing computer-readable instructions, such as those contained within the modules described herein. In their most basic configuration, these computing device(s) may each include at least one memory device and at least one physical processor.

In some examples, the term "memory device" generally refers to any type or form of volatile or non-volatile storage device or medium capable of storing data and/or computer-readable instructions. In one example, a memory device may store, load, and/or maintain one or more of the modules described herein. Examples of memory devices include, without limitation, Random Access Memory (RAM), Read Only Memory (ROM), flash memory, Hard Disk Drives (HDDs), Solid-State Drives (SSDs), optical disk drives, caches, variations or combinations of one or more of the same, or any other suitable storage memory.

In some examples, the term "physical processor" generally refers to any type or form of hardware-implemented processing unit capable of interpreting and/or executing computer-readable instructions. In one example, a physical processor may access and/or modify one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), portions of one or more of the same, variations or combinations of one or more of the same, or any other suitable physical processor.

Although illustrated as separate elements, the modules described and/or illustrated herein may represent portions of a single module or application. In addition, in certain embodiments one or more of these modules may represent one or more software applications or programs that, when executed by a computing device, may cause the computing device to perform one or more tasks. For example, one or more of the modules described and/or illustrated herein may represent modules stored and configured to run on one or more of the computing devices or systems described and/or illustrated herein. One or more of these modules may also represent all or portions of one or more special-purpose computers configured to perform one or more tasks.

In addition, one or more of the modules described herein may transform data, physical devices, and/or representations of physical devices from one form to another. For example, one or more of the modules recited herein may receive state data of a client device to be transformed, transform the state data, output a result of the transformation to train a machine learning model, use the result of the transformation to predict forcible termination of a software application, and store the result of the transformation to prevent the forcible termination of the application. Additionally or alternatively, one or more of the modules recited herein may transform a processor, volatile memory, non-volatile memory, and/or any other portion of a physical computing device from one form to another by executing on the computing device, storing data on the computing device, and/or otherwise interacting with the computing device.

In some embodiments, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the present disclosure. The embodiments disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A computer-implemented method comprising:
   detecting an application running in a background state on a client device;
   collecting state data about a current state of the client device;
   determining, by applying a machine learning model to the collected state data to calculate a likelihood of forcible termination of the application within a predetermined timeframe, that the calculated likelihood exceeds a threshold between forcible termination and continuation of the background state, wherein the machine learning model predicts a timing of forcible termination; and
   reducing a computing resource footprint of the application on the client device to reduce the calculated likelihood of forcible termination of the application within the predetermined timeframe, wherein the predetermined timeframe includes a sufficient amount of time to reduce the computing resource footprint prior to the predicted timing of forcible termination.

2. The method of claim 1, wherein the background state comprises:
   a closed state of the application; and
   a use of at least one computing resource of the client device by the application.

3. The method of claim 1, wherein the state data comprises a state of at least one of:
   a memory;
   a battery;
   a processor;
   a network connection;
   an operating system;
   the application; or
   a second application.

4. The method of claim 3, wherein the machine learning model comprises a model trained using at least one of:
   historical state data of the client device;
   historical state data of a second client device;
   a historical record of forcible termination of the application; or
   a historical record of forcible termination of the second application.

5. The method of claim 3, wherein forcible termination comprises an automated termination of at least one background process of the application by the operating system of the client device.

6. The method of claim 1, wherein reducing the computing resource footprint comprises at least one of:
   reducing usage of a memory cache;
   terminating a process of the application;
   reducing a size of the application; or
   terminating usage of a computing resource.

7. The method of claim 1, wherein reducing the computing resource footprint to reduce the calculated likelihood of forcible termination of the application comprises:
   identifying a target state of the client device with a target likelihood of forcible termination of the application that does not exceed the threshold; and
   reducing the computing resource footprint to achieve the target state of the client device.

8. The method of claim 1, further comprising:
   detecting a change in the current state of the client device; and
   adjusting the calculated likelihood of forcible termination of the application based on the change.

9. The method of claim 8, further comprising predicting a future state of the client device based on the change in the current state of the client device.

10. The method of claim 1, further comprising:
    detecting a forcible termination of the application within the predetermined timeframe; and
    updating historical data with the collected state data and the forcible termination.

11. The method of claim 10, further comprising retraining the machine learning model with the updated historical data.

12. A system comprising:
    a detection module, stored in memory, that detects an application running in a background state on a client device;
    a collection module, stored in memory, that collects state data about a current state of the client device;
    a determination module, stored in memory, that determines, by applying a machine learning model to the collected state data to calculate a likelihood of forcible termination of the application within a predetermined timeframe, that the calculated likelihood exceeds a threshold between forcible termination and continuation of the background state, wherein the machine learning model predicts a timing of forcible termination;
    a reduction module, stored in memory, that reduces a computing resource footprint of the application on the client device to reduce the calculated likelihood of forcible termination of the application within the predetermined timeframe, wherein the predetermined timeframe includes a sufficient amount of time to reduce the computing resource footprint prior to the predicted timing of forcible termination; and at least one processor that executes the detection module, the collection module, the determination module, and the reduction module.

13. The system of claim 12, wherein the detection module detects the background state of the application by:
   detecting a closing of the application; and
   monitoring a continued background process of the application after the closing of the application.

14. The system of claim 12, wherein the collection module comprises at least one of:
   a client module on the client device that sends the collected state data to a server; or
   a server module on the server that requests the collected state data from the client device.

15. The system of claim 14, wherein the machine learning model is trained by at least one of:
   the client device using historical state data of the client device; or
   the server using historical state data of multiple client devices.

16. The system of claim 14, wherein the server sends the machine learning model to the client device.

17. The system of claim 12, wherein the machine learning model is tailored to at least one of:
   the application;
   the client device; or
   a user of the client device.

18. The system of claim 12, wherein the determination module determines that the calculated likelihood of forcible termination of the application within the predetermined timeframe does not exceed the threshold.

19. The system of claim 18, wherein the reduction module suspends a reduction of the computing resource footprint based on determining the calculated likelihood of forcible termination does not exceed the threshold.

20. A non-transitory computer-readable medium comprising one or more computer-executable instructions that, when executed by at least one processor of a computing device, cause the computing device to:
   detect an application running in a background state on a client device;
   collect state data about a current state of the client device;
   determine, by applying a machine learning model to the collected state data to calculate a likelihood of forcible termination of the application within a predetermined timeframe, that the calculated likelihood exceeds a threshold between forcible termination and continuation of the background state, wherein the machine learning model predicts a timing of forcible termination; and
   reduce a computing resource footprint of the application on the client device to reduce the calculated likelihood of forcible termination of the application within the predetermined timeframe, wherein the predetermined timeframe includes a sufficient amount of time to reduce the computing resource footprint prior to the predicted timing of forcible termination.

* * * * *